United States Patent
Akkarakaran et al.

(10) Patent No.: US 12,207,358 B2
(45) Date of Patent: Jan. 21, 2025

(54) INTEGRATED ACCESS AND BACKHAUL (IAB) TIMING HANDLING FOR POSITIONING

(71) Applicant: QUALCOMM Incorporated, San Diego, CA (US)

(72) Inventors: Sony Akkarakaran, Poway, CA (US); Tao Luo, San Diego, CA (US); Navid Abedini, Basking Ridge, NJ (US); Sven Fischer, Nuremberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 2 days.

(21) Appl. No.: 18/450,303

(22) Filed: Aug. 15, 2023

(65) Prior Publication Data
US 2023/0397302 A1   Dec. 7, 2023

Related U.S. Application Data

(62) Division of application No. 17/026,739, filed on Sep. 21, 2020, now Pat. No. 11,770,875.
(Continued)

(51) Int. Cl.
| | | |
|---|---|---|
| *H04W 88/14* | (2009.01) | |
| *H04W 56/00* | (2009.01) | |
| *H04W 64/00* | (2009.01) | |

(52) U.S. Cl.
CPC ....... *H04W 88/14* (2013.01); *H04W 56/0045* (2013.01); *H04W 64/00* (2013.01)

(58) Field of Classification Search
CPC ......... H04W 56/0005; H04W 56/0015; H04W 56/0045; H04W 64/00; H04W 64/006; H04W 84/042; H04W 88/14
(Continued)

(56) References Cited

U.S. PATENT DOCUMENTS

| | | | | |
|---|---|---|---|---|
| 10,279,731 B2* | 5/2019 | Suzuki | ..................... | B60Q 1/42 |
| 2006/0153302 A1* | 7/2006 | Esaki | ................... | H04N 19/134 |
| | | | | 375/E7.176 |

(Continued)

FOREIGN PATENT DOCUMENTS

CN   104583803 A   4/2015

OTHER PUBLICATIONS

Samsung: "Discussion on OTA Timing Alignment for IAB", 3GPP Draft, 3GPP TSG-RAN WG4 Meeting #90Bis, R4-1903345, 3rd Generation Partnership Project, Mobile Competence Centre, 650, Route Des Lucioles, F-06921 Sophia-Antipolis Cedex, France, vol. RAN WG4, No. Xi'an, China, Apr. 8, 2019-Apr. 12, 2019, Apr. 1, 2019, XP051713775, 4 pages, the whole document.
(Continued)

*Primary Examiner* — Joseph Arevalo
(74) *Attorney, Agent, or Firm* — Muncy, Geissler, Olds & Lowe, P.C.

(57) ABSTRACT

Disclosed are techniques for wireless communication. In an aspect, an integrated access and backhaul (IAB) node sets a downlink transmission timing of the IAB node relative to a downlink reception timing of the IAB node based on a first set of values for a set of timing parameters, receives, from a parent IAB node of the IAB node, a second set of values for the set of timing parameters, and transmits, to a positioning entity, a report indicating a change from the first set of values to the second set of values, a new downlink transmission timing based on the second set of values, or a change in downlink transmission timing.

24 Claims, 14 Drawing Sheets

Related U.S. Application Data

(60) Provisional application No. 62/910,272, filed on Oct. 3, 2019.

(58) Field of Classification Search
USPC ....... 370/329, 318, 252, 350, 331, 330, 328, 370/259, 315
See application file for complete search history.

(56) References Cited

U.S. PATENT DOCUMENTS

| | | |
|---|---|---|
| 2015/0189610 A1 | 7/2015 | Siomina et al. |
| 2019/0116605 A1 | 4/2019 | Luo et al. |
| 2019/0141754 A1 | 5/2019 | Bai et al. |
| 2020/0045610 A1* | 2/2020 | Shih .................. H04L 45/28 |
| 2020/0051282 A1* | 2/2020 | Watanabe ............... G06T 7/593 |
| 2020/0059879 A1 | 2/2020 | Nam et al. |
| 2020/0229126 A1 | 7/2020 | Soriaga et al. |
| 2020/0322976 A1 | 10/2020 | Islam et al. |
| 2020/0344666 A1* | 10/2020 | Wang .................. H04L 69/324 |
| 2021/0068092 A1 | 3/2021 | Abedini et al. |
| 2021/0105867 A1 | 4/2021 | Akkarakaran et al. |
| 2021/0195539 A1 | 6/2021 | Sheng et al. |
| 2021/0219260 A1* | 7/2021 | Kumar ................ H04W 84/02 |
| 2021/0250898 A1 | 8/2021 | Abedini et al. |
| 2021/0345211 A1 | 11/2021 | Keskitalo et al. |
| 2021/0345324 A1 | 11/2021 | Liu et al. |
| 2021/0352607 A1 | 11/2021 | Miao |
| 2022/0070809 A1 | 3/2022 | Song et al. |
| 2022/0104155 A1* | 3/2022 | Dortschy ............. H04W 56/005 |
| 2022/0322472 A1* | 10/2022 | Kusashima ........... H04W 76/15 |

OTHER PUBLICATIONS

European Search Report—EP22207261—Search Authority—the Hague—Dec. 21, 2022.
Ghosh A., et al., "5G Evolution: A View on 5G Cellular Technology Beyond 3GPP, Release 15", IEEE Access, vol. 7, Sep. 6, 2019 (Sep. 6, 2019), pp. 127639-127651, XP011746509, DOI: 10.1109/ACCESS. 2019.2939938, [retrieved on Sep. 16, 2019], fig 15, p. 127646.
International Preliminary Report on Patentability—PCT/US2020/ 052035, the International Bureau of WIPO—Geneva, Switzerland, Apr. 14, 2022.
International Search Report and Written Opinion—PCT/US2020/ 052035—ISA/EPO—Jan. 29, 2021.

* cited by examiner

INTEGRATED ACCESS AND BACKHAUL (IAB) TIMING HANDLING FOR POSITIONING

CROSS-REFERENCE TO RELATED APPLICATIONS

The present application for Patent is a Divisional Applications of U.S. patent application Ser. No. 17/026,739, entitled "INTEGRATED ACCESS AND BACKHAUL (IAB) TIMING HANDLING FOR POSITIONING," filed Sep. 21, 2020, which claims the benefit of U.S. Provisional Application No. 62/910,272, entitled "INTEGRATED ACCESS AND BACKHAUL (IAB) TIMING HANDLING FOR POSITIONING," filed Oct. 3, 2019, all of the above are assigned to the assignee hereof, and expressly incorporated herein by reference in their entireties.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the global system for mobile communication (GSM), etc.

A fifth generation (5G) wireless standard, referred to as New Radio (NR), enables higher data transfer speeds, greater numbers of connections, and better coverage, among other improvements. The NR standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of NR mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by an integrated access and backhaul (IAB) node includes setting a downlink transmission timing of the IAB node relative to a downlink reception timing of the IAB node based on a first set of values for a set of timing parameters; receiving, from a parent IAB node of the IAB node, a second set of values for the set of timing parameters; and transmitting, to a positioning entity, a report indicating a change from the first set of values to the second set of values, a new downlink transmission timing based on the second set of values, or a change in downlink transmission timing.

In an aspect, a method of wireless communication performed by a central unit (CU) in an IAB network includes receiving, from a location server, an identifier of at least one IAB node transmitting positioning reference signals to a user equipment (UE) engaged in a positioning session; and transmitting, to each of one or more IAB nodes supported by the CU, including the at least one IAB node, an instruction to prevent the one or more IAB nodes from updating a set of timing parameters associated with a downlink transmission timing relative to a downlink reception timing.

In an aspect, an IAB node includes a memory; at least one transceiver; and at least one processor communicatively coupled to the memory and the at least one transceiver, the at least one processor configured to: set a downlink transmission timing of the IAB node relative to a downlink reception timing of the IAB node based on a first set of values for a set of timing parameters; receive, from a parent IAB node of the IAB node, a second set of values for the set of timing parameters; and cause the at least one transceiver to transmit, to a positioning entity, a report indicating the second set of values or a change from the first set of values to the second set of values, a new downlink transmission timing based on the second set of values, or a change in downlink transmission timing.

In an aspect, a CU in an IAB network includes a memory; at least one transceiver; and at least one processor communicatively coupled to the memory and the at least one transceiver, the at least one processor configured to: receive, from a location server, an identifier of at least one IAB node transmitting positioning reference signals to a UE engaged in a positioning session; and cause the at least one transceiver to transmit, to each of one or more IAB nodes supported by the CU, including the at least one IAB node, an instruction to prevent the one or more IAB nodes from updating a set of timing parameters associated with a downlink transmission timing relative to a downlink reception timing.

In an aspect, an IAB node includes means for setting a downlink transmission timing of the IAB node relative to a downlink reception timing of the IAB node based on a first set of values for a set of timing parameters; means for receiving, from a parent IAB node of the IAB node, a second set of values for the set of timing parameters; and means for transmitting, to a positioning entity, a report indicating the second set of values or a change from the first set of values to the second set of values, a new downlink transmission timing based on the second set of values, or a change in downlink transmission timing.

In an aspect, a CU in an IAB network includes means for receiving, from a location server, an identifier of at least one IAB node transmitting positioning reference signals to a user equipment (UE) engaged in a positioning session; and transmitting, to each of one or more IAB nodes supported by the CU, including the at least one IAB node, an instruction to prevent the one or more IAB nodes from updating a set of timing parameters associated with a downlink transmission timing relative to a downlink reception timing.

In an aspect, a non-transitory computer-readable medium storing computer-executable instructions includes computer-executable instructions comprising: at least one instruction instructing an IAB node to set a downlink transmission timing of the IAB node relative to a downlink reception timing of the IAB node based on a first set of values for a set of timing parameters; at least one instruction instructing the IAB node to receive, from a parent IAB node of the IAB node, a second set of values for the set of timing parameters; and at least one instruction instructing the IAB node to transmit, to a positioning entity, a report indicating the second set of values or a change from the first set of values to the second set of values, a new downlink transmission timing based on the second set of values, or a change in downlink transmission timing.

In an aspect, a non-transitory computer-readable medium storing computer-executable instructions includes computer-executable instructions comprising: at least one instruction instructing a CU in an IAB network to receive, from a location server, an identifier of at least one IAB node transmitting positioning reference signals to a user equipment (UE) engaged in a positioning session; and at least one instruction instructing the CU to transmit, to each of one or more IAB nodes supported by the CU, including the at least one IAB node, an instruction to prevent the one or more IAB nodes from updating a set of timing parameters associated with a downlink transmission timing relative to a downlink reception timing.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
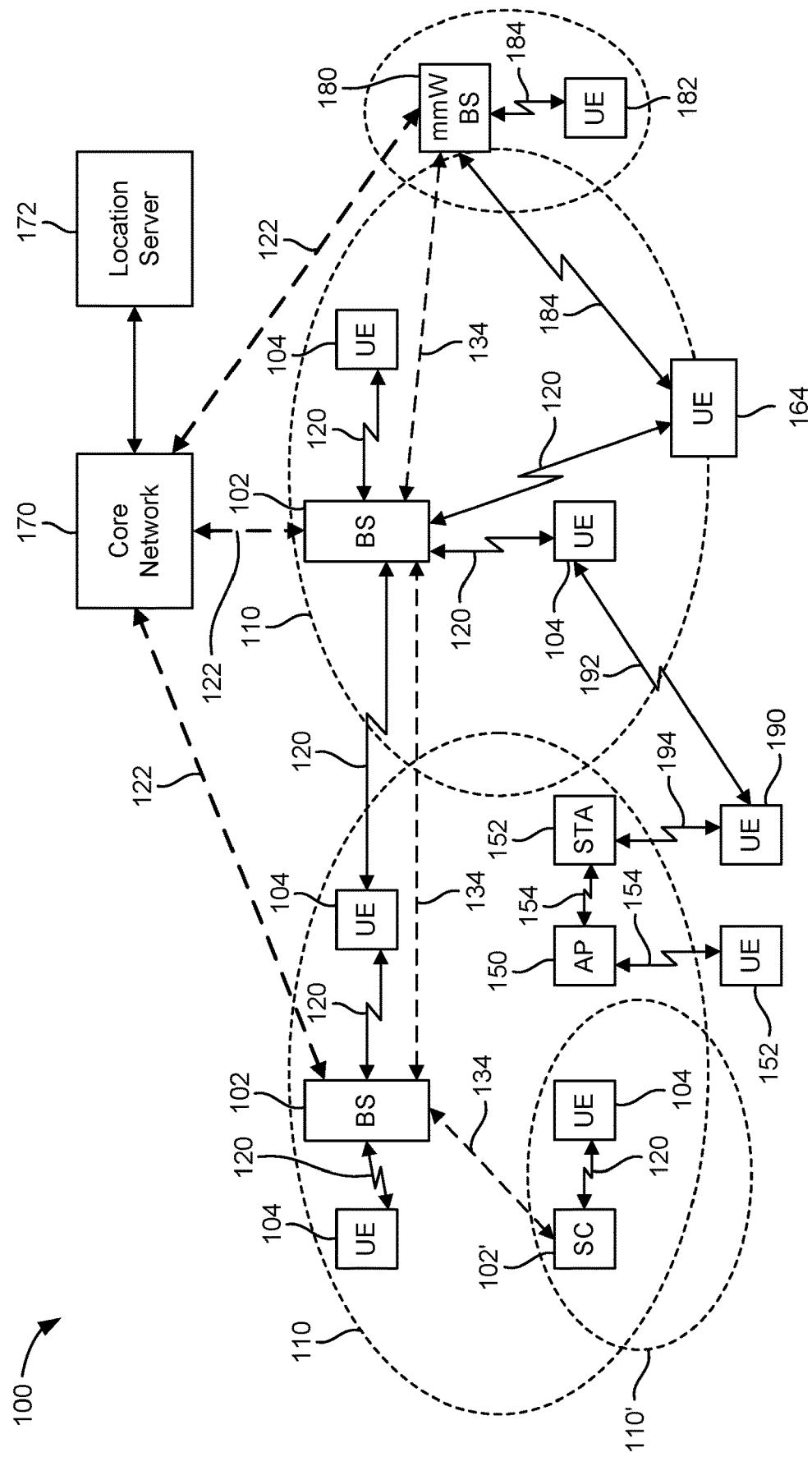
FIG. 1 illustrates an example wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

In an aspect, the small cell base station 102' may be an integrated access and backhaul (IAB) node and the macro cell base station 102 to which it is connected may be an IAB donor. As will be discussed further below, an IAB node includes network access functionality to which UEs (e.g., UE 104) can connect (and therefore behaves like a base station towards the UEs) and backhaul functionality that behaves like a UE towards its parent node (which may be another IAB node, or a distributed unit (DU) connected by wireline to a central unit (CU), which is referred to as an IAB donor).

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. In an aspect, the UE 104 to which the UE 190 is connected may be an IAB node and the macro cell base station 102 to which it is connected may be an IAB donor.

Figure 2A:
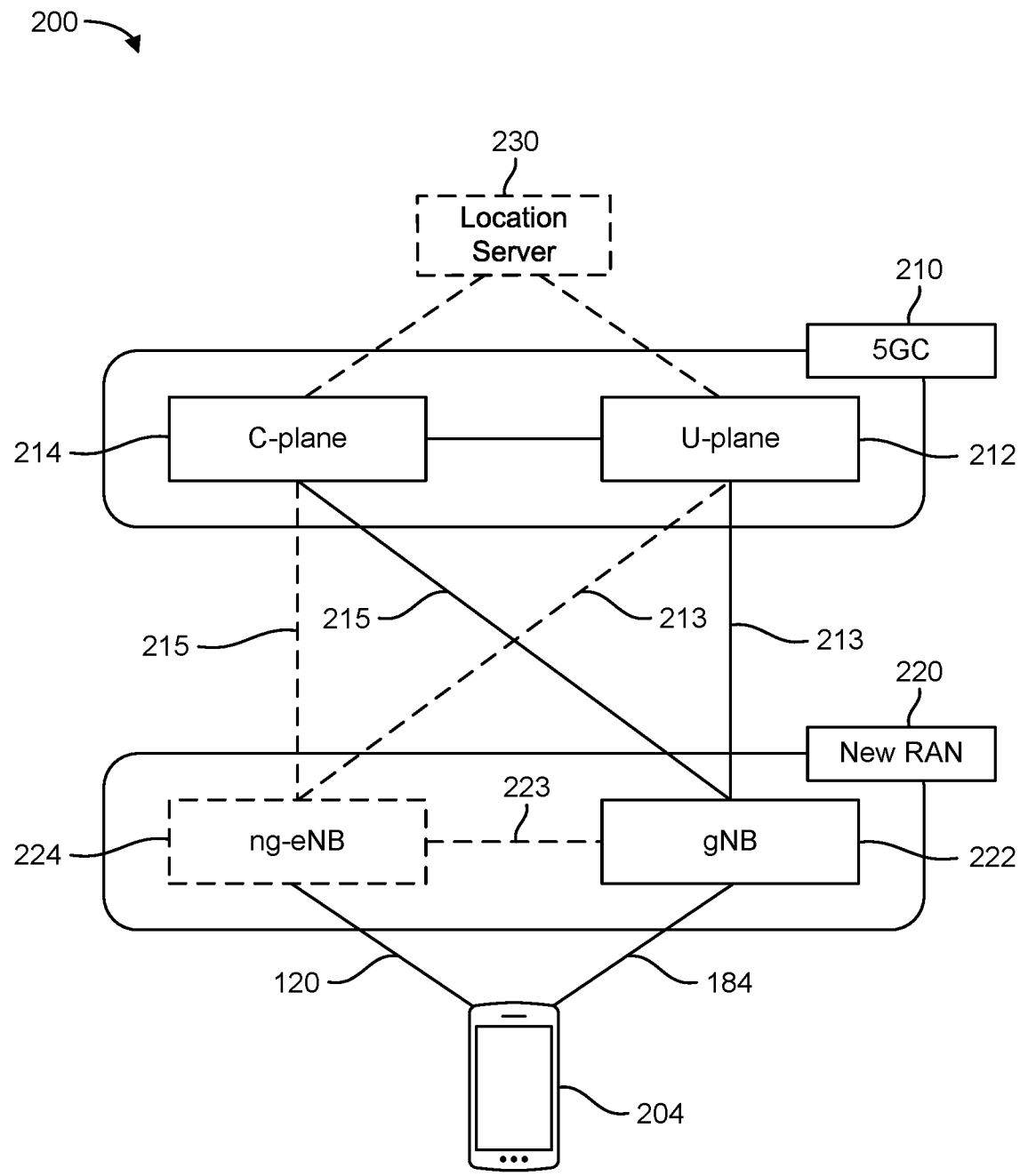
FIGS. 2A and 2B illustrate example wireless network structures, according to various aspects.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
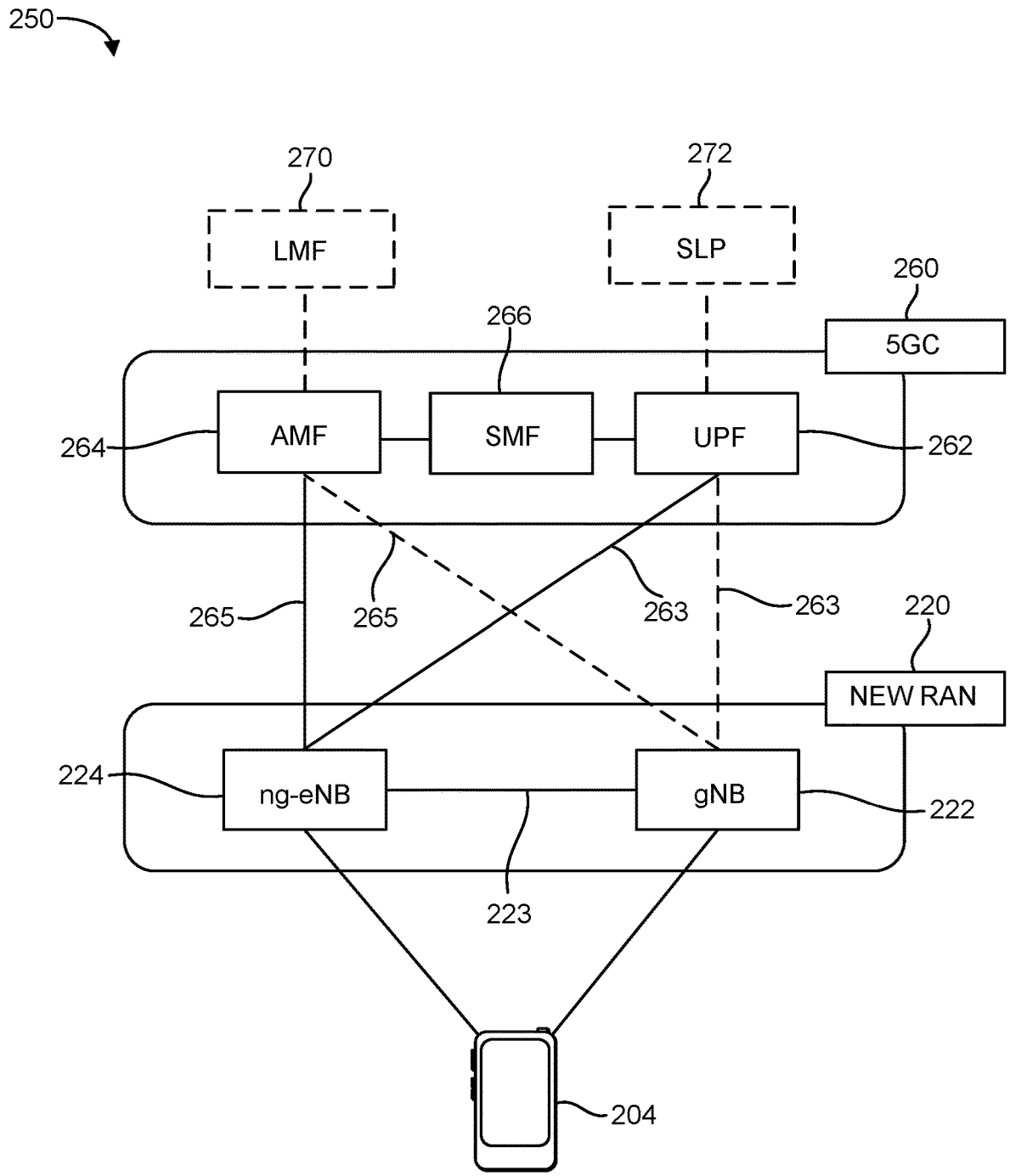

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component" (LMC) or "location server surrogate" (LSS). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
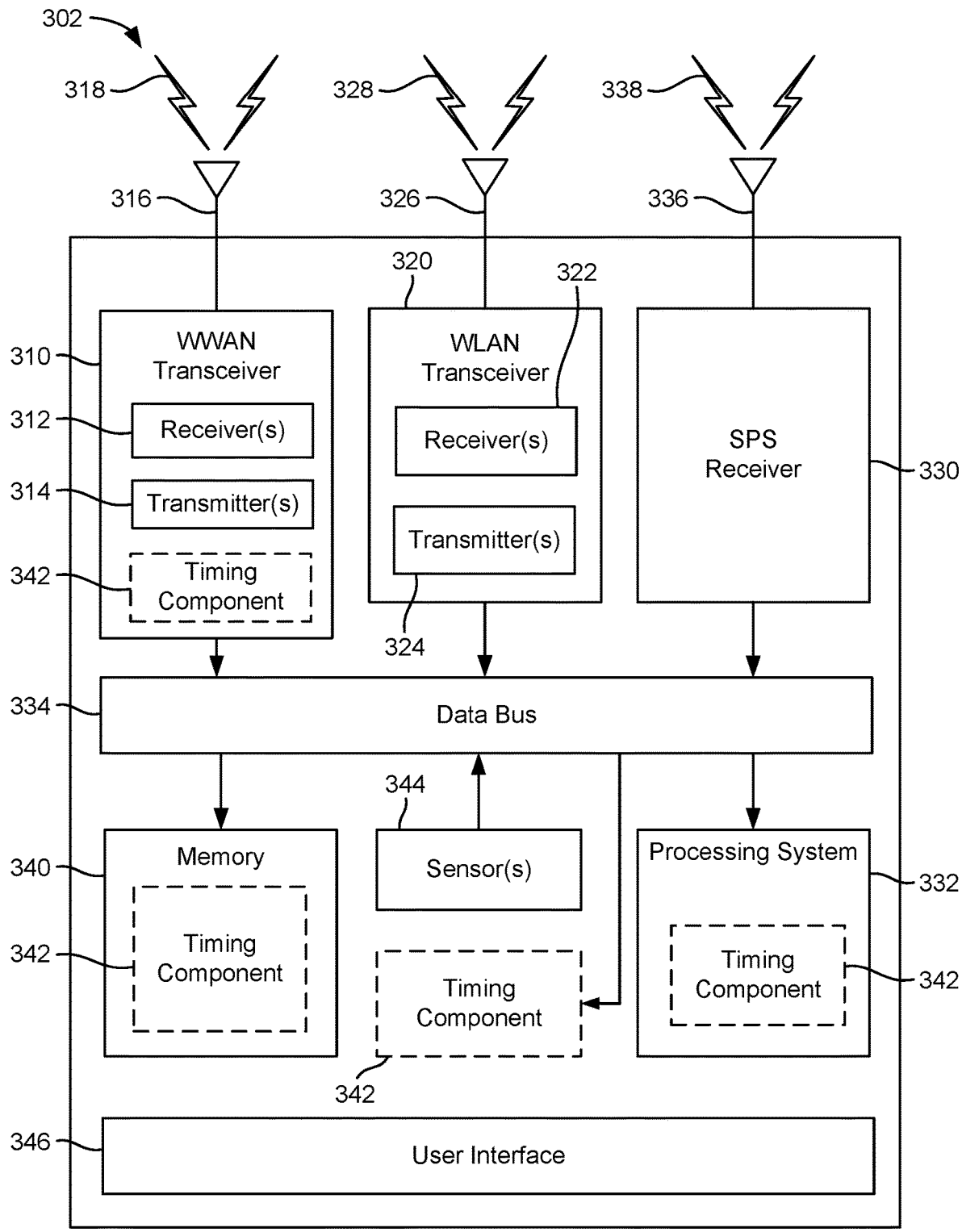
FIGS. 3A to 3C are simplified block diagrams of several sample aspects of components that may be employed in a UE, a base station, and a network entity, respectively is a block diagram illustrating example apparatuses, according to various aspects.
Figure 3B:
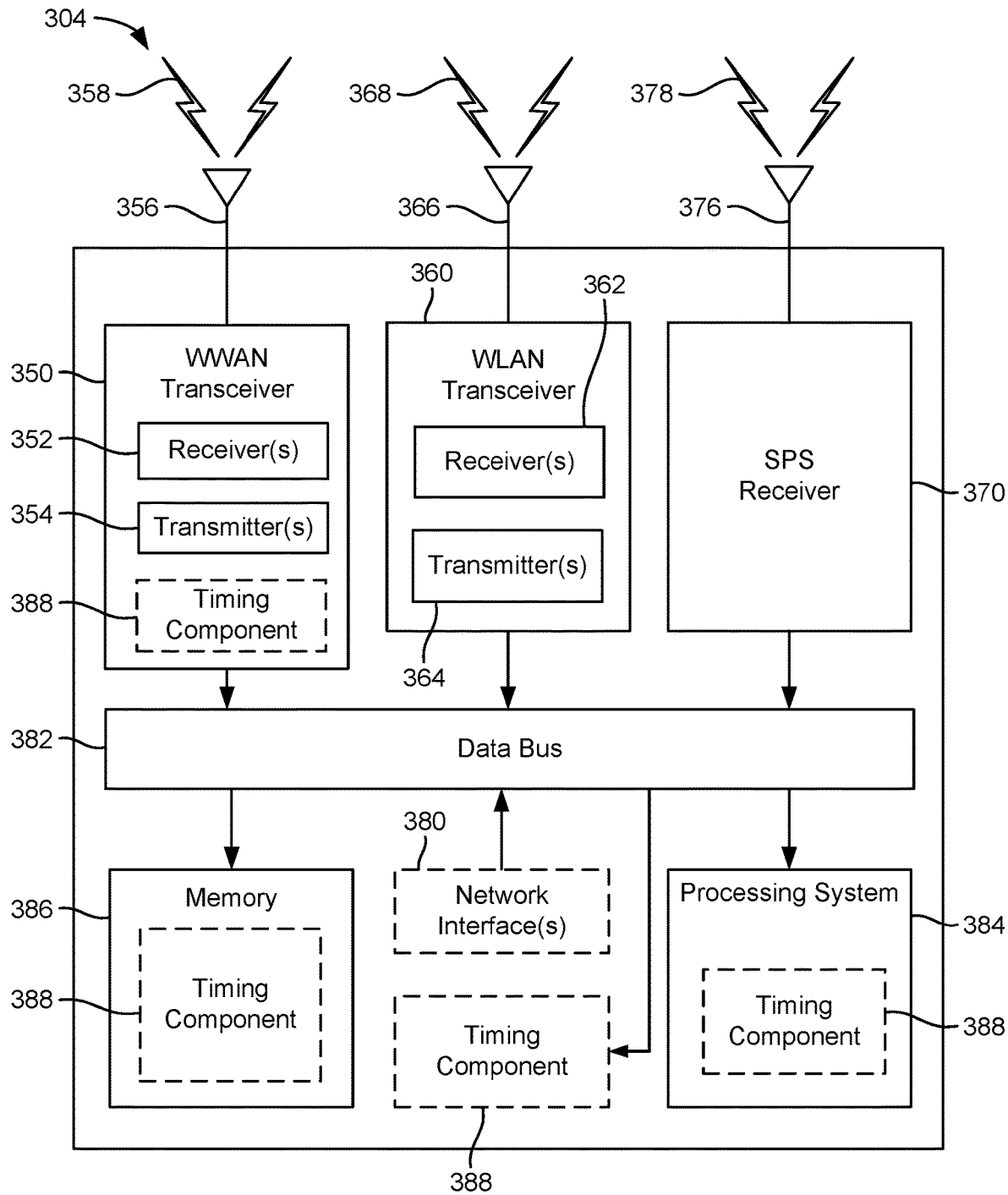
Figure 3C:
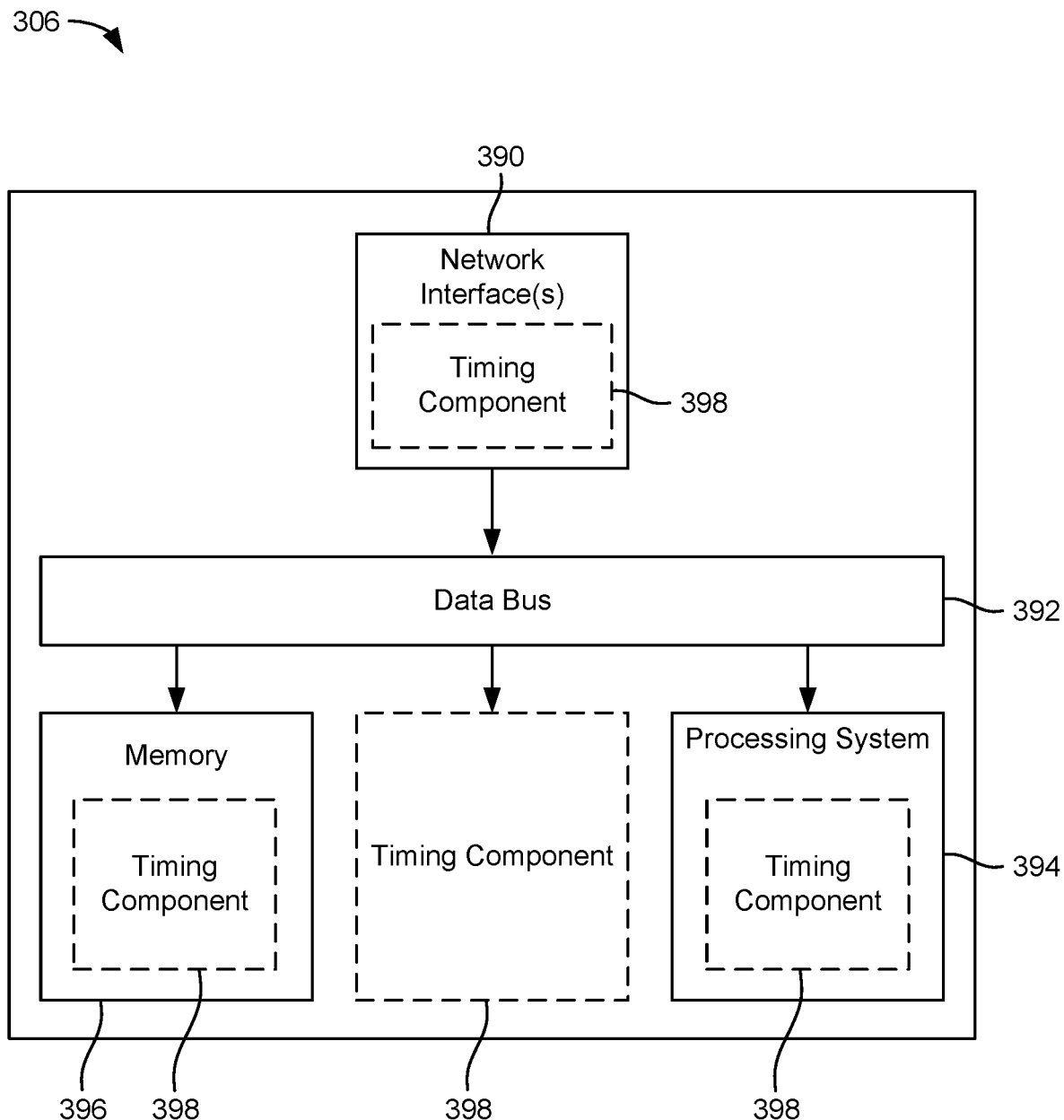

FIGS. 3A, 3B, and 3C illustrate several example components (represented by corresponding blocks) that may be incorporated into a UE 302 (which may correspond to any of the UEs described herein), an IAB node 304 (which may be embodied in any of the base stations or UEs described herein), and a network entity 306 (which may correspond to or embody any of the network functions described herein, including the location server 230 and the LMF 270) to support the operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the IAB node 304 each include wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the IAB node 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

The IAB node 304 includes access functionality to which UEs can connect (and therefore behaves like a base station towards the UEs) and backhaul functionality that behaves like a UE towards its parent node (which may be another IAB node, or a DU connected by wireline to a CU, which is referred to as an IAB donor). Thus, the WWAN transceiver 350 may provide network access to the UE 302, and the WWAN transceiver 350 and/or the network interface(s) 380 may behave like a UE towards the IAB node's 304 parent node. For example, where the IAB node's 304 parent node is another IAB node, the WWAN transceiver 350 may behave like a UE towards the other IAB node. Note that although an IAB node 304 comprises a DU function and a mobile terminal (MT) function and both the DU and MT functions need their own transmit and receive capability, the actual hardware and software functionalities for the DU and the MT functions may be separate (e.g., WWAN transceiver 350 and network interface(s) 380) or may be shared between them (e.g., WWAN transceiver 350), meaning the distinction between the DU and the MT functions may be a logical partition rather than a physical one.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the IAB node 304 may also comprise a network listen module (NLM) or the like for performing various measurements.

The UE 302 and the IAB node 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the IAB node 304 using measurements obtained by any suitable SPS algorithm.

The IAB node 304 and the network entity 306 may each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the IAB node 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The IAB node 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the IAB node 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the IAB node 304, and the network entity 306 may include timing components 342, 388, and 398, respectively. The timing components 342, 388, and 398 may be hardware circuits that are part of or coupled to the processing systems 332, 384, and 394, respectively, that, when executed, cause the UE 302, the IAB node 304, and the network entity 306 to perform the functionality described herein. In other aspects, the timing components 342, 388, and 398 may be external to the processing systems 332, 384, and 394 (e.g., part of a modem processing system, integrated with another processing system, etc.). Alternatively, the timing components 342, 388, and 398 may be memory modules stored in the memory components 340, 386, and 396, respectively, that, when executed by the processing systems 332, 384, and 394 (or a modem processing system, another processing system, etc.), cause the UE 302, the IAB node 304, and the network entity 306 to perform the functionality described herein. FIG. 3A illustrates possible locations of the timing component 342, which may be part of the WWAN transceiver 310, the memory component 340, the processing system 332, or any combination thereof, or may be a standalone component. FIG. 3B illustrates possible locations of the timing component 388, which may be part of the WWAN transceiver 350, the memory component 386, the processing system 384, or any combination thereof, or may be a standalone component. FIG. 3C illustrates possible locations of the timing component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the IAB node 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 304. These soft decisions may be based on channel estimates computed by a channel estimator. The soft decisions are then decoded and de-interleaved to recover the data and control signals that were originally transmitted by the IAB node 304 on the physical channel. The data and control signals are then provided to the processing system 332, which implements Layer-3 (the RRC layer) and Layer-2 (L2) (the service data adaptation protocol (SDAP), PDCP, RLC, and MAC layers) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the IAB node 304 towards the UE 302, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the IAB node 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the IAB node 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the IAB node 304, and/or the network entity 306 are shown in FIGS. 3A-C as including various components that may be configured according to the various examples described herein. It will be appreciated, however, that the illustrated blocks may have different functionality in different designs.

The various components of the UE 302, the IAB node 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the IAB node 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the timing components 342, 388, and 398, etc.

Figure 4:
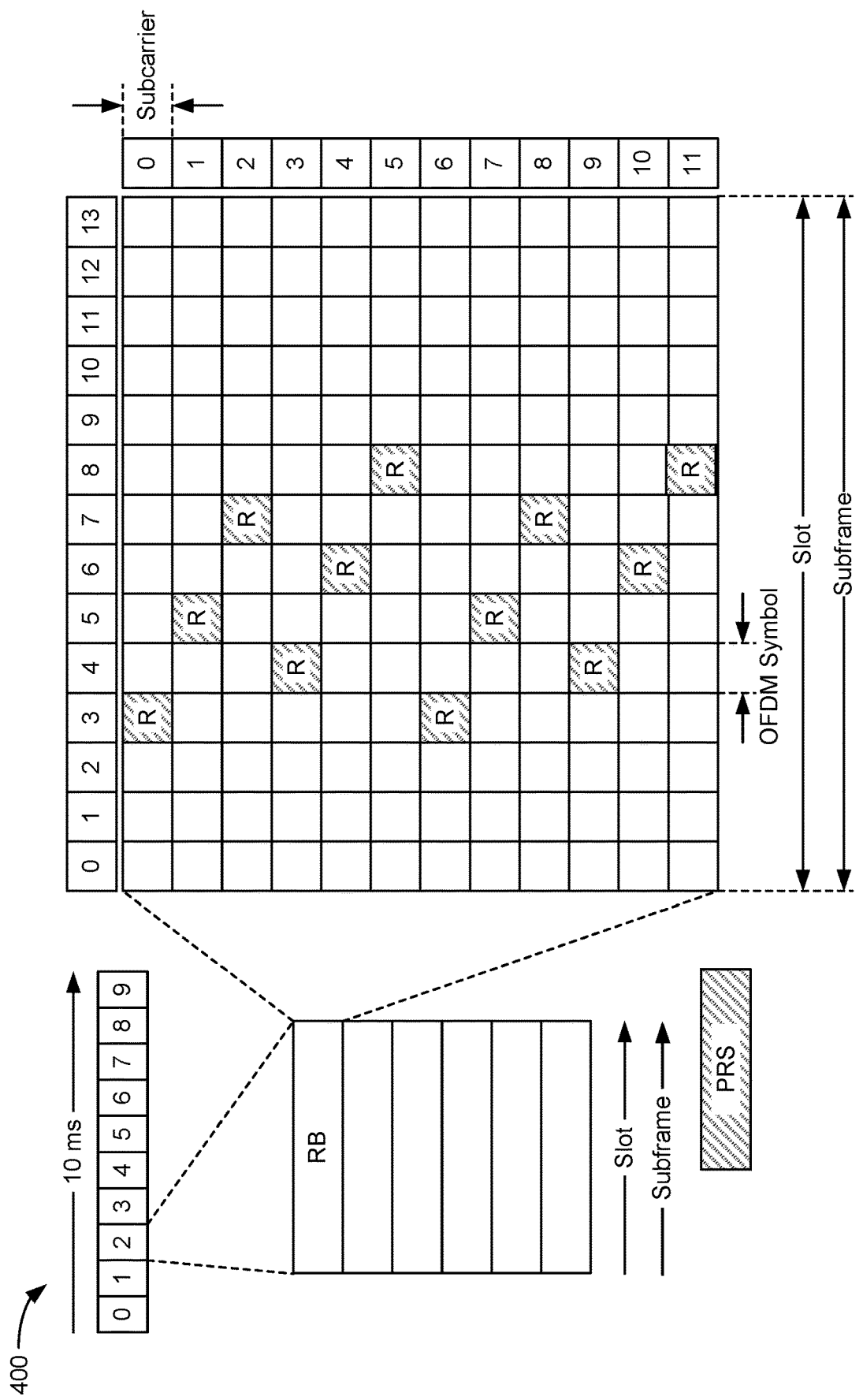
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 is a diagram 400 illustrating an example of a frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (p), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Sub-frame | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIG. 4, a numerology of 15 kHz is used. Thus, in the time domain, a 10 millisecond (ms) frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Where the frame structure illustrated in FIG. 4 is a downlink frame structure, some of the REs may carry downlink reference (pilot) signals (DL-RS). The DL-RS may include PRS, TRS, PTRS, CRS, CSI-RS, DMRS, PSS, SSS, SSB, etc. FIG. 4 illustrates example locations of REs carrying PRS (labeled "R").

A collection of resource elements that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS as defined in LTE and 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
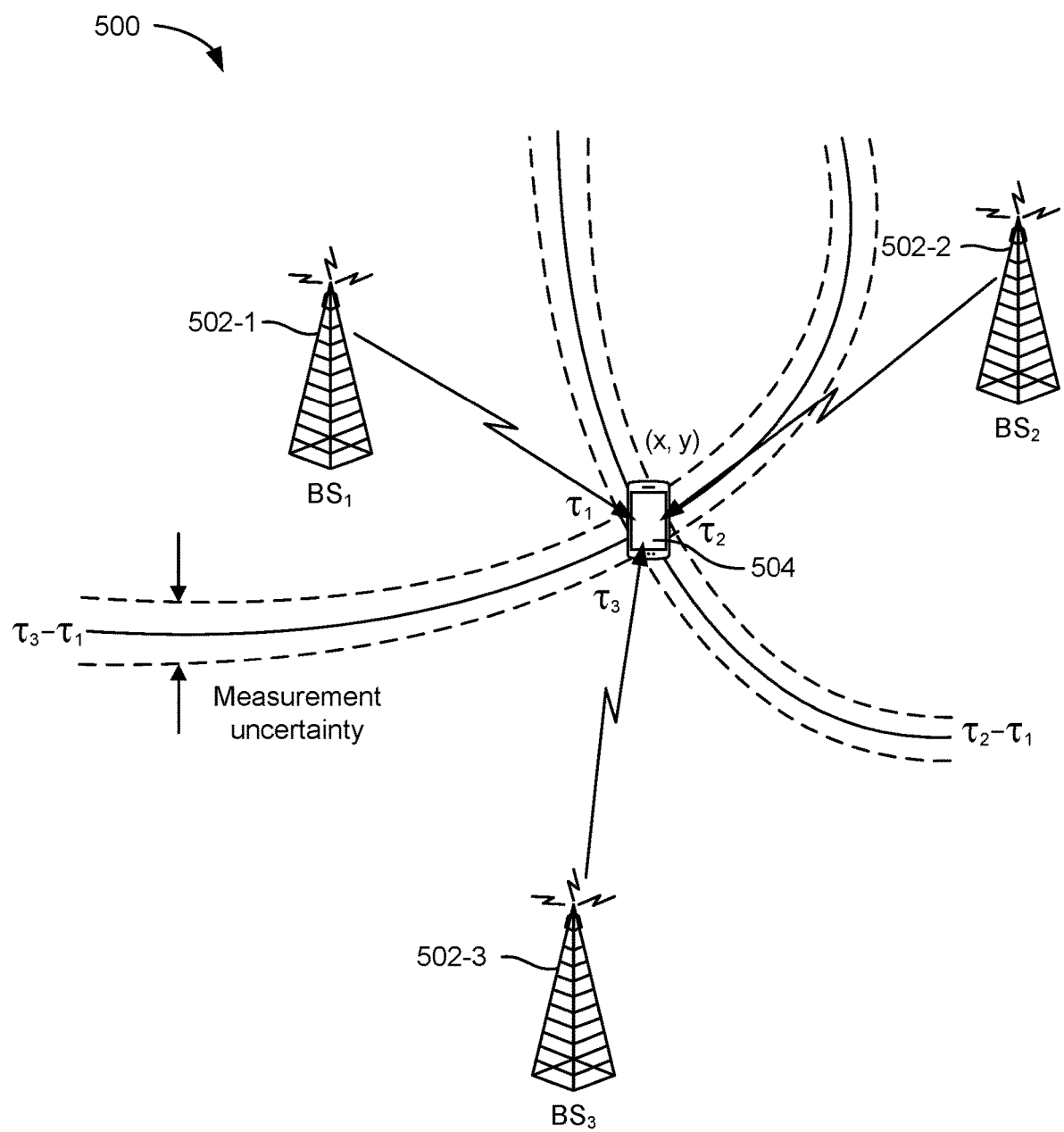
FIGS. 5 and 6 are diagrams illustrating example techniques for determining a location of a mobile device using information obtained from a plurality of base stations.

FIG. 5 illustrates an example wireless communications system 500 in which a UE 504 (which may correspond to any of the UEs described herein) is attempting to calculate, or assist another entity (e.g., a serving base station or core network component, another UE, a location server, a third party application, etc.) to calculate, an estimate of its location, according to aspects of the disclosure. The UE 504 may communicate wirelessly with a plurality of cells/TRPs supported by a corresponding plurality of base stations 502-1, 502-2, and 502-3 (collectively, base stations 502), which may correspond to cells/TRPs of any combination of the base stations described herein. In an aspect, the location of the UE 504 may be specified using a two-dimensional (2D) coordinate system, or a three-dimensional (3D) coordinate system if the extra dimension is desired. Additionally, while FIG. 5 illustrates one UE 504 and three base stations 502, as will be appreciated, there may be more UEs 504 and more or fewer base stations 502.

To support location estimates, the cells/TRPs of base stations 502 may be configured to broadcast positioning reference signals (e.g., PRS, TRS, CRS, etc.) to UEs 504 in their coverage area to enable a UE 504 to measure characteristics of such reference signals. For example, as briefly described above, the OTDOA positioning method in LTE is a multilateration method in which the UE 504 measures the time difference, known as the RSTD, between specific reference signals (e.g., LTE PRS) transmitted by the cells/TRPs of different pairs of base stations 502 and either reports these time differences to a location server (e.g., location server 230 or LMF 270), referred to as UE-assisted positioning, or computes a location estimate itself from these time differences, referred to as UE-based positioning. DL-TDOA is a similar positioning method in NR, but uses NR positioning reference signals, such as NR PRS, TRS, CRS, CSI-RS, DMRS, SSB, PSS, SSS, etc.

Generally, RSTDs are measured between a cell/TRP of a reference base station (e.g., base station 502-1 in the example of FIG. 5), referred to as a reference cell/TRP and one or more cells/TRPs of neighbor base stations (e.g., base stations 502-2 and 502-3 in the example of FIG. 5), referred to as neighbor cells/TRPs. The reference cell/TRP remains the same for all RSTDs measured by the UE 504 for any single positioning use of OTDOA/DL-TDOA, and would typically correspond to the serving cell/TRP for the UE 504 or the cell/TRP of another nearby base station with good signal strength at the UE 504. Note that a UE (e.g., UE 504) normally measures RSTDs of reference signals transmitted by the cells/TRPs of different base stations 502, rather than different cells/TRPs of the same base station 502.

To assist positioning operations, a location server (e.g., location server 230, LMF 270, SLP 272) may provide OTDOA/DL-TDOA assistance data to the UE 504 for the cell/TRP of the reference base station (base station 502-1 in the example of FIG. 5) and the cells/TRPs of the neighbor base stations (base stations 502-2 and 502-3 in the example of FIG. 5) relative to the reference cell/TRP. For example, the assistance data may provide the center channel frequency of each cell/TRP, various reference signal configuration parameters (e.g., the number of consecutive positioning subframes, periodicity of positioning subframes, muting sequence, frequency hopping sequence, reference signal identifier (ID), reference signal bandwidth, etc.), a cell/TRP global ID, and/or other cell/TRP related parameters applicable to OTDOA/DL-TDOA. The assistance data may indicate the serving cell/TRP for the UE 504 as the reference cell/TRP.

In some cases, the assistance data may also include "expected RSTD" parameters, which provide the UE 504 with information about the RSTD values the UE 504 is expected to measure at its current location between the cell/TRP of the reference base station 502-1 and the cell/TRP of each neighbor base station 502-2 and 502-3, together with an uncertainty of the expected RSTD parameter (referred to as the "expected RSTD uncertainty"). The expected RSTD, together with the associated uncertainty, may define a search window for the UE 504 within which the UE 504 is expected to measure the RSTD value for a pair of cells/TRPs. OTDOA/DL-TDOA assistance data may also include reference signal configuration parameters, which allow the UE 504 to determine when a reference signal positioning occasion occurs on signals received from the various neighbor cells/TRPs relative to reference signal positioning occasions for the reference cell/TRP, and to determine the reference signal sequence transmitted from various cells/TRPs in order to measure a signal ToA or RSTD.

In an aspect, while the location server (e.g., location server 230, LMF 270, SLP 272) may send the assistance data to the UE 504, alternatively, the assistance data can originate directly from the cells/TRPs of the base stations 502 themselves (e.g., in periodically broadcasted overhead messages). Alternatively, the UE 504 can detect neighbor cells/TRPs itself without the use of assistance data.

The UE 504 (e.g., based in part on the assistance data, if provided) can measure and (optionally) report the RSTDs between reference signals received from the cells/TRPs of pairs of different base stations 502. Using the RSTD measurements, the known absolute or relative transmission timing (e.g., whether the involved base stations 502 are accurately synchronized or whether each base station 502 transmits with some known time difference relative to other base stations 502) of each cell/TRP, and the known physical locations of the transmitting antennas for the reference and neighboring base stations, the network (e.g., location server 230/LMF 270/SLP 272, the serving base station 502) or the UE 504 may estimate a location of the UE 504. More particularly, the RSTD for a neighbor cell/TRP "k" relative to a reference cell/TRP "Ref" may be given as $(ToA_k - ToA_{Ref})$, where the ToA values may be measured modulo one slot duration (e.g., 1 ms) to remove the effects of measuring different slots at different times. In the example of FIG. 5, the measured time differences between the reference cell/TRP of base station 502-1 and the cells/TRPs of neighboring base stations 502-2 and 502-3 are represented as $\tau_2-\tau_1$ and $\tau_3-\tau_1$, where $\tau_1$, $\tau_2$, and $\tau_3$ represent the ToA of a reference signal from the cells/TRPs of base stations 502-1, 502-2, and 502-3, respectively. The UE 504 may then convert the ToA measurements for different cells/TRPs to RSTD measurements and (optionally) send them to the location server 230/LMF 270. Using (i) the RSTD measurements, (ii) the known absolute or relative transmission timing of each cell/TRP, (iii) the known physical locations of the transmitting antennas for the reference and neighboring base stations, and/or (iv) directional reference signal characteristics, such as a direction of transmission, the UE's 504 location may be estimated (either by the UE 504 or the location server 230/LMF 270).

Still referring to FIG. 5, when the UE 504 obtains a location estimate using the OTDOA/DL-TDOA positioning method, the necessary additional data (e.g., the base stations' 502 locations and relative transmission timing) may be provided to the UE 504 by a location server (e.g., location server 230, LMF 270). In some implementations, a location estimate for the UE 504 may be obtained (e.g., by the UE 504 itself or by the location server 230/LMF 270) from RSTDs and from other measurements made by the UE 504 (e.g., measurements of signal timing from GPS or other global navigation satellite system (GNSS) satellites). In these implementations, known as hybrid positioning, the RSTDs may contribute towards obtaining the UE's 504 location estimate but may not wholly determine the location estimate.

OTDOA and DL-OTDOA positioning methods need precise timing synchronization across the involved base stations. That is, the start of each downlink radio frame must begin at precisely the same time, or have some known offset from a reference time. In NR, however, there may not be a requirement for precise timing synchronization across base stations. Instead, it may be sufficient to have coarse time-synchronization across base stations (e.g., within a cyclic prefix (CP) duration of the OFDM symbols). RTT-based methods generally only need coarse timing synchronization, and as such, are a common positioning method in NR.

In a network-centric RTT estimation, the serving base station instructs the UE to scan for/receive the RTT measurement signals from two or more neighboring base stations (and typically the serving base station, as at least three base stations are needed). The one or more base stations transmit RTT measurement signals on low reuse resources (i.e., resources used by the base station to transmit system information) allocated by the network (e.g., location server 230, LMF 270, SLP 272). The UE records the arrival time (also referred to as the receive time, reception time, time of reception, or time of arrival) of each RTT measurement signal relative to the UE's current downlink timing (e.g., as derived by the UE from a downlink signal received from its serving base station), and transmits a common or individual RTT response message to the involved base stations (e.g., when instructed by its serving base station), and may include each of the measured arrival times in a payload of the RTT response message(s).

A UE-centric RTT estimation is similar to the network-based method, except that the UE transmits uplink RTT measurement signal(s) (e.g., when instructed by a serving base station or location server), which are received by multiple base stations in the neighborhood of the UE. Each involved base station responds with a downlink RTT response message, which may include the arrival time of the RTT measurement signal at the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response messages or signals that may include the arrival (or receive) time(s) of the first message(s) or signal(s) in the RTT response message payload.

Figure 6:
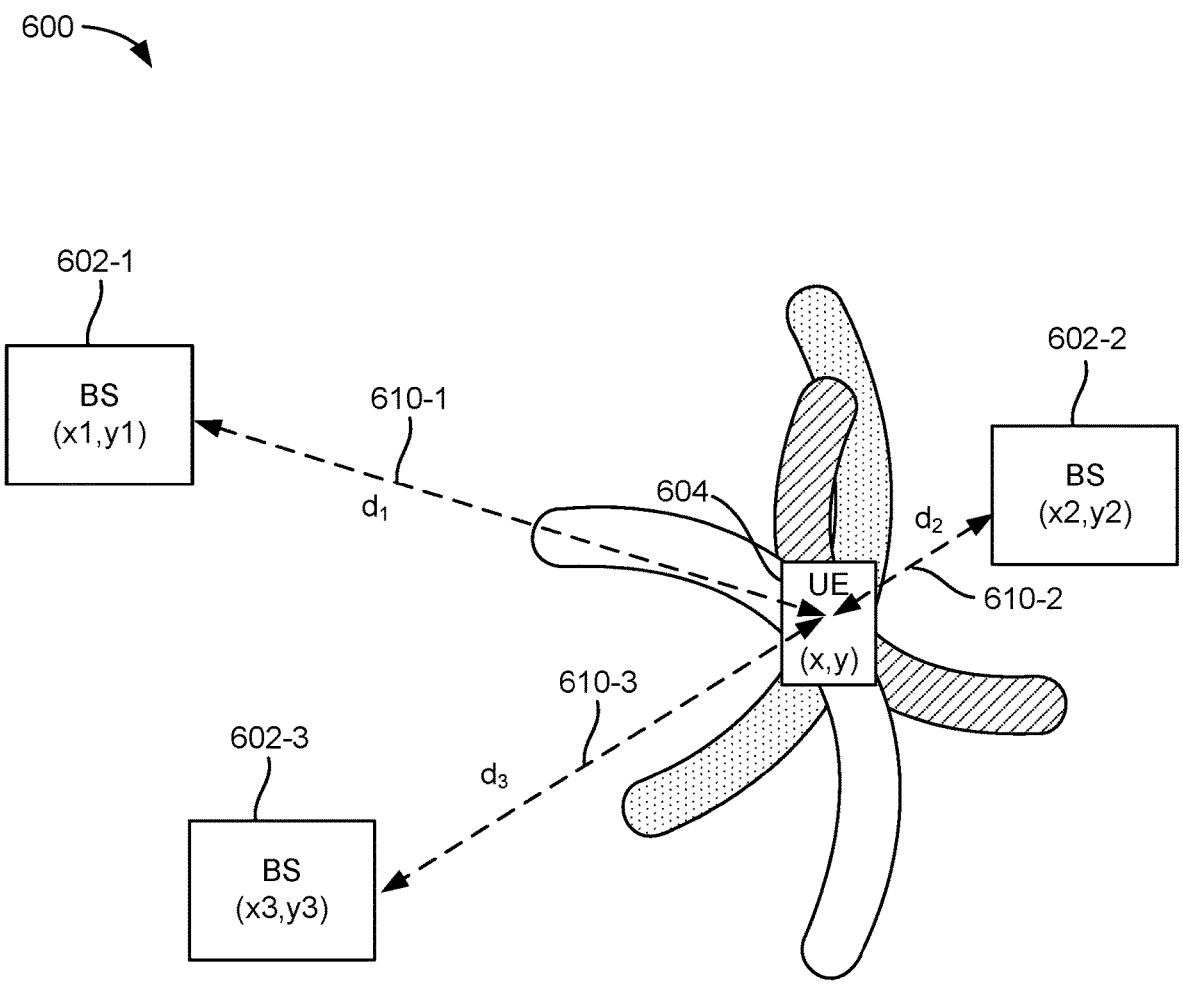

FIG. 6 illustrates an example wireless communications system 600 according to aspects of the disclosure. In the example of FIG. 6, a UE 604 (which may correspond to any of the UEs described herein) is attempting to calculate an estimate of its location, or assist another entity (e.g., a base station or core network component, another UE, a location server, a third party application, etc.) to calculate an estimate of its location. The UE 604 may communicate wirelessly with a plurality of base stations (BS) 602-1, 602-2, and 602-3 (collectively, base stations 602, and which may correspond to any of the base stations described herein) using RF signals and standardized protocols for the modulation of the RF signals and the exchange of information packets. By extracting different types of information from the exchanged signals, and utilizing the layout of the wireless communications system 600 (i.e., the base stations' locations, geometry, etc.), the UE 604 may determine its location, or assist in the determination of its location, in a predefined reference coordinate system. In an aspect, the UE 604 may specify its location using a two-dimensional coordinate system; however, the aspects disclosed herein are not so limited, and may also be applicable to determining locations using a three-dimensional coordinate system, if the extra dimension is desired. Additionally, while FIG. 6 illustrates one UE 604 and three base stations 602, as will be appreciated, there may be more UEs 604 and more base stations 602.

To support location estimates, the base stations 602 may be configured to broadcast reference RF signals (e.g., PRS, CRS, TRS, CSI-RS, SSB, PSS, SSS, etc.) to UEs 604 in their coverage area to enable a UE 604 to measure characteristics of such reference signals. For example, the UE 604 may measure the time of arrival (ToA) of specific reference signals (e.g., PRS, CRS, CSI-RS, etc.) transmitted by at least three different base stations 602-1, 602-2, and 602-3 and may use the RTT positioning method to report these ToAs (and additional information) back to the serving base station 602 or another positioning entity (e.g., location server 230, LMF 270, SLP 272).

In an aspect, although described as the UE 604 measuring reference signals from a base station 602, the UE 604 may measure reference signals from one of multiple cells or TRPs supported by a base station 602. Where the UE 604 measures reference signals transmitted by a cell/TRP supported by a base station 602, the at least two other reference signals measured by the UE 604 to perform the RTT procedure would be from cells/TRPs supported by base stations 602 different from the first base station 602 and may have good or poor signal strength at the UE 604.

In order to determine the location (x, y) of the UE 604, the entity determining the location of the UE 604 needs to know the locations of the base stations 602, which may be represented in a reference coordinate system as $(x_k, y_k)$, where k=1, 2, 3 in the example of FIG. 6. Where one of the base stations 602 (e.g., the serving base station) or the UE 604 determines the location of the UE 604, the locations of the involved base stations 602 may be provided to the serving base station 602 or the UE 604 by a location server with knowledge of the network geometry (e.g., location server 230, LMF 270, SLP 272). Alternatively, the location server may determine the location of the UE 604 using the known network geometry.

Either the UE 604 or the respective base station 602 may determine the distance 610 ($d_k$, where k=1, 2, 3) between the UE 604 and the respective base station 602. Specifically, in the example of FIG. 6, the distance 610-1 between the UE 604 and the base station 602-1 is $d_1$, the distance 610-2 between the UE 604 and the base station 602-2 is $d_2$, and the distance 610-3 between the UE 604 and the base station 602-3 is $d_3$. In an aspect, determining the RTT of the RF signals exchanged between the UE 604 and any base station 602 can be performed and converted to a distance 610 ($d_k$).

Once each distance 610 is determined, the UE 604, a base station 602, or the location server (e.g., location server 230, LMF 270, SLP 272) can solve for the location (x, y) of the UE 604 by using a variety of known geometric techniques, such as, for example, trilateration. From FIG. 6, it can be seen that the location of the UE 604 ideally lies at the common intersection of three semicircles, each semicircle being defined by radius $d_k$ and center $(x_k, y_k)$, where k=1, 2, 3.

For DL-TDOA positioning techniques (as described above with reference to FIG. 5), the UE measures the TDOA between PRS from different cells. With known cell locations, the TDOA measurements can be used to determine the location of the UE. In UE-based positioning, the UE is informed of the cells' locations, whereas in UE-assisted positioning, the UE reports the TDOA measurements to a location server (e.g., location server 230, LMF 270, SLP 272). The location server knows the cells' locations and can therefore compute the UE's location. Note that the UE actually reports RSTD measurements, which comprise a portion attributable to the difference in flight times from the two cells plus the real time difference (RTD) (i.e., the synchronization offset between the measured cells). The location server may know the RTDs (e.g., by requesting the system frame number (SFN) initialization time from the base stations supporting the cells) and may compute the flight time difference based on that, and then compute the location of the UE based on the reported TDOA.

To measure the TDOA, the UE searches for PRS from neighbor cells, which may arrive outside the CP duration of the serving cell. The network (e.g., location server 230, LMF 270, serving cell) may provide the UE with a rough time window for this search. This may be provided by the parameters "expected RSTD" and "expected RSTD uncertainty" as described above with reference to FIG. 5. The time window may be determined by the synchronization offset between the cells and the expected flight time difference based on a prior rough estimate of the UE's location. The synchronization offset relative to the serving cell may be directly provided to the UE, along with the uncertainty/drift rate. For example, this may be provided via LTE positioning protocol (LPP) signaling. The UE may then compute the flight time difference instead of the RSTD and report it or use it for UE-based positioning.

For RTT positioning techniques, since RTT is a pair-wise procedure between the UE and each base station, synchronization offsets are not needed to determine the UE's location. However, they are still needed to determine the search window, as just described. Thus, positioning is dependent, in multiple ways (depending on the positioning method used), on knowledge of the synchronization offsets (or RTDs) at the involved cells.

Due to the expected larger bandwidth and faster speeds available for NR compared to LTE (e.g., mmW spectrum), along with the native deployment of massive MIMO or multi-beam systems in NR, there is an opportunity to develop and deploy IAB. IA B provides an alternative to wired backhaul by extending NR to support wireless backhaul. As a result, it is possible to use NR for a wireless link from a central location to distributed cell sites and between cell sites. This can simplify the deployment of, for example, small cells (e.g., small cell base station 102' in FIG. 1) and may be useful for temporary deployments for special events or emergency situations. IAB can be used in any frequency band in which NR can operate; however, it is anticipated that mmW spectrum will be the most relevant spectrum for the backhaul link due to the increased speed and capacity. Further, the access link to the UE may operate in either the same frequency band as the backhaul link (referred to as in-band operation) or by using a separate frequency band (referred to as out-of-band operation).

Figure 7:
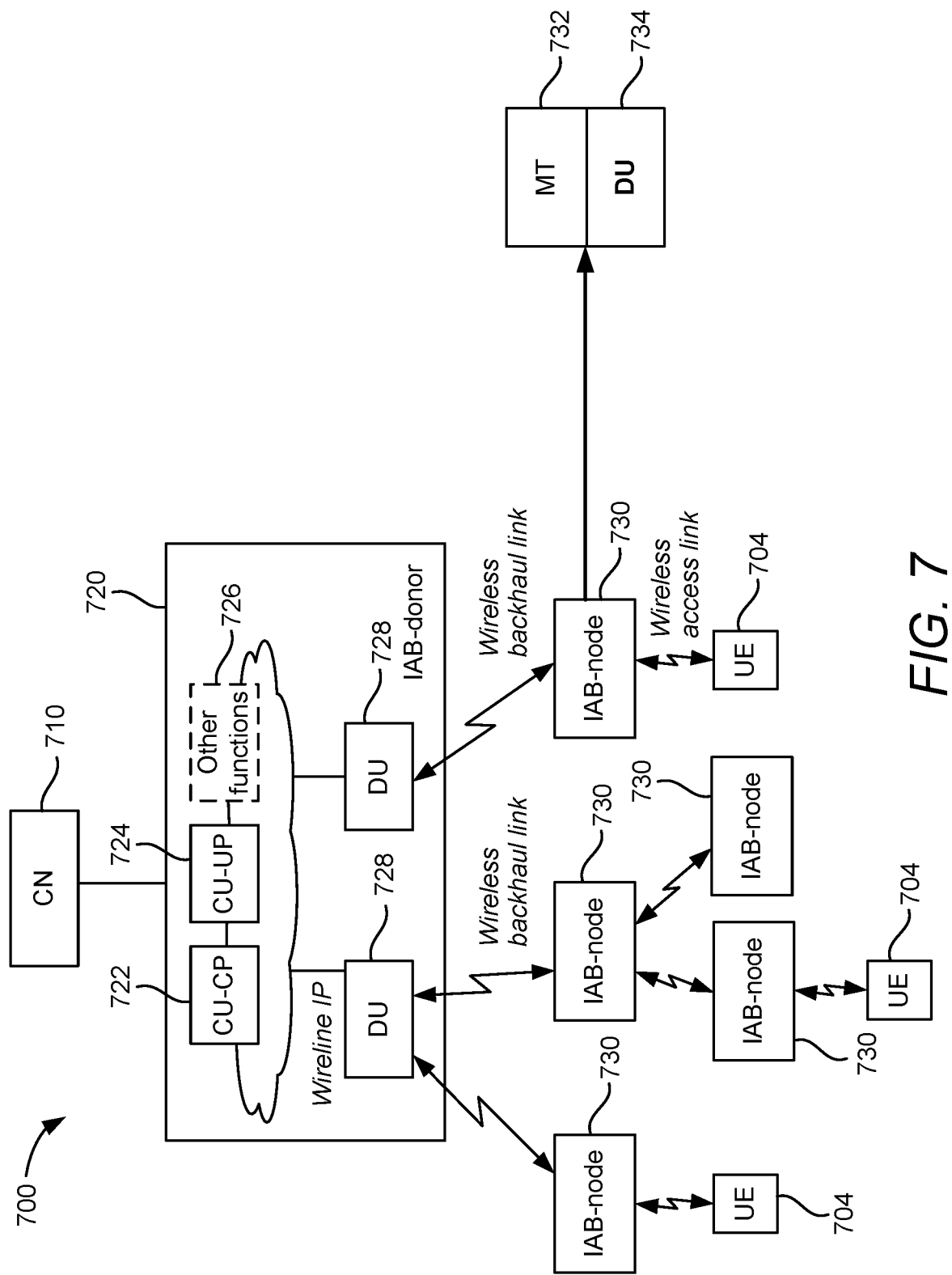
FIG. 7 illustrates an example of an integrated access and backhaul (IAB) network structure 700 according to various aspects of the disclosure.

FIG. 7 illustrates an example of an IAB network structure 700 according to various aspects of the disclosure. The IAB network structure 700 includes a core network (CN) 710, which may correspond to 5GC 210 or 260, and at least one IAB donor 720. The IAB donor 720 may be a RAN node (e.g., a base station) that provides a UE's interface to the core network 710 and wireless backhaul functionality to downstream IAB nodes 730. The IAB donor 720 includes a CU control plane (CP) function 722, a CU user plane (UP) function 724, and other functions 726. These various functions are connected to one or more DUs 728 (two in the example of FIG. 7) over wireline IP links. The DUs 728 of the IAB donor 720 act as cells (e.g., the cells of a base station) to which one or more IAB nodes 730 can connect. As shown in FIG. 7, the links between the DUs 728 and the IAB nodes 730 are wireless backhaul links.

An IAB node 730 (e.g., a macro cell base station or a small cell base station) includes a DU function 734 that behaves like a base station towards its child nodes (e.g., UEs 704 and/or other IAB nodes 730) and a mobile terminal (MT) function 732 that behaves like a UE towards its parent node (e.g., another IAB node 730 or a DU 728 of the IAB donor 720). An IAB node 730 creates cells of its own and appears as a normal base station to UEs 704 and/or other IAB nodes 730 connecting to it. As shown in FIG. 7, the links between a parent IAB node 730 and its child nodes (e.g., UEs 704 and/or other IAB nodes 730) are referred to as wireless access links. Connecting an IAB node 730 to the network uses the same initial access mechanism (e.g., a random-access channel (RACH) procedure) as a UE 704. Once connected, an IAB node 730 receives the necessary configuration from the IAB donor 720. Additional child IAB nodes 730 can connect to the network through the cells created by a parent IAB node 730, thereby enabling multi-hop wireless backhauling.

Figure 8:
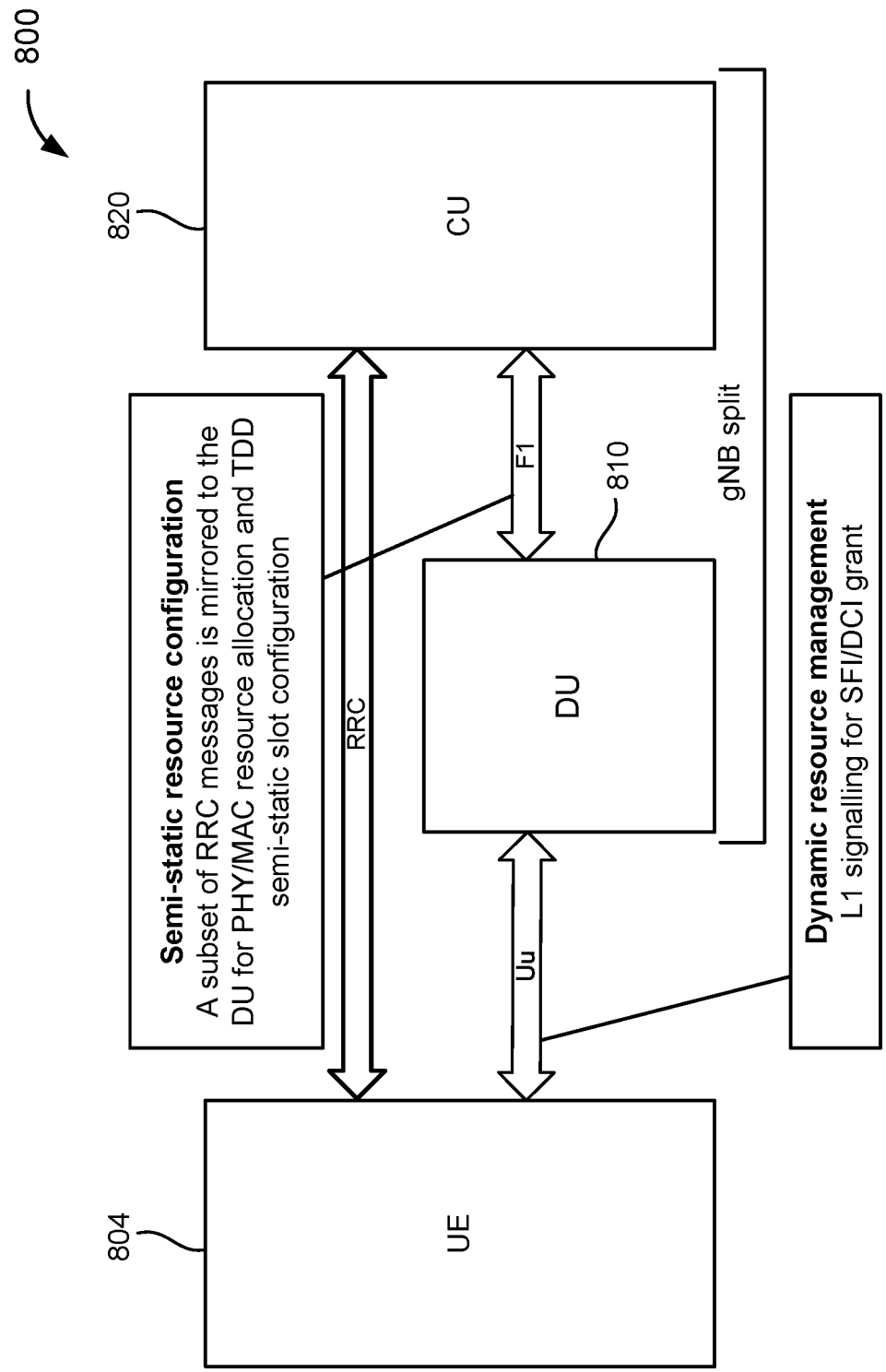
FIG. 8 is a diagram of an example resource management framework for implementing IAB, according to aspects of the disclosure.

FIG. 8 is a diagram of an example resource management framework 800 for implementing IAB in 3GPP Release 15 (the first full set of 5G NR standards), according to aspects of the disclosure. As shown in FIG. 8, the functionality of a base station (e.g., a gNB) is split between a CU 820 and one or more DUs 810. The CU 820 and DU(s) 810 may correspond to an IAB donor (e.g., IAB donor 720). The CU 820 and DU(s) 810 may be physically separated depending on the deployment, if separate, they may communicate over a wired backhaul link such as illustrated in FIG. 7 between CU-CP 722 and CU-UP 724 and the DUs 728 of the IAB donor 720. The interface over which the CU 820 and the DU(s) 810 communicate is a front-haul interface referred to as the "F1-AP" or "F1" interface.

The CU 820 is a logical node that includes the base station functions of transferring user data, mobility control, radio access network sharing, positioning, session management, and the like, except for those functions allocated exclusively to the DU 810. More specifically, the CU 820 includes the RRC and PDCP layers of the base station, while the DU(s) 810 includes the RLC. MAC, and PH Y layers of the base station. As noted in FIG. 8, for semi-static resource configuration in the resource management framework 800, a subset of RRC layer messages is mirrored to the DU 810 for PHY/MAC resource allocation and time division duplex (TDD) semi-static slot configuration. However, for dynamic resource allocation, the DU(s) 810 configure the UE 804 using Layer-1 (L1) signaling for slot format indicator (SFI) and downlink control information (DCI) grants. Note that in NR, the air interface between the base station (or the DU(s) 810 in an IAB deployment) and the UE 804 is referred to as the "Uu" interface.

Figure 9:
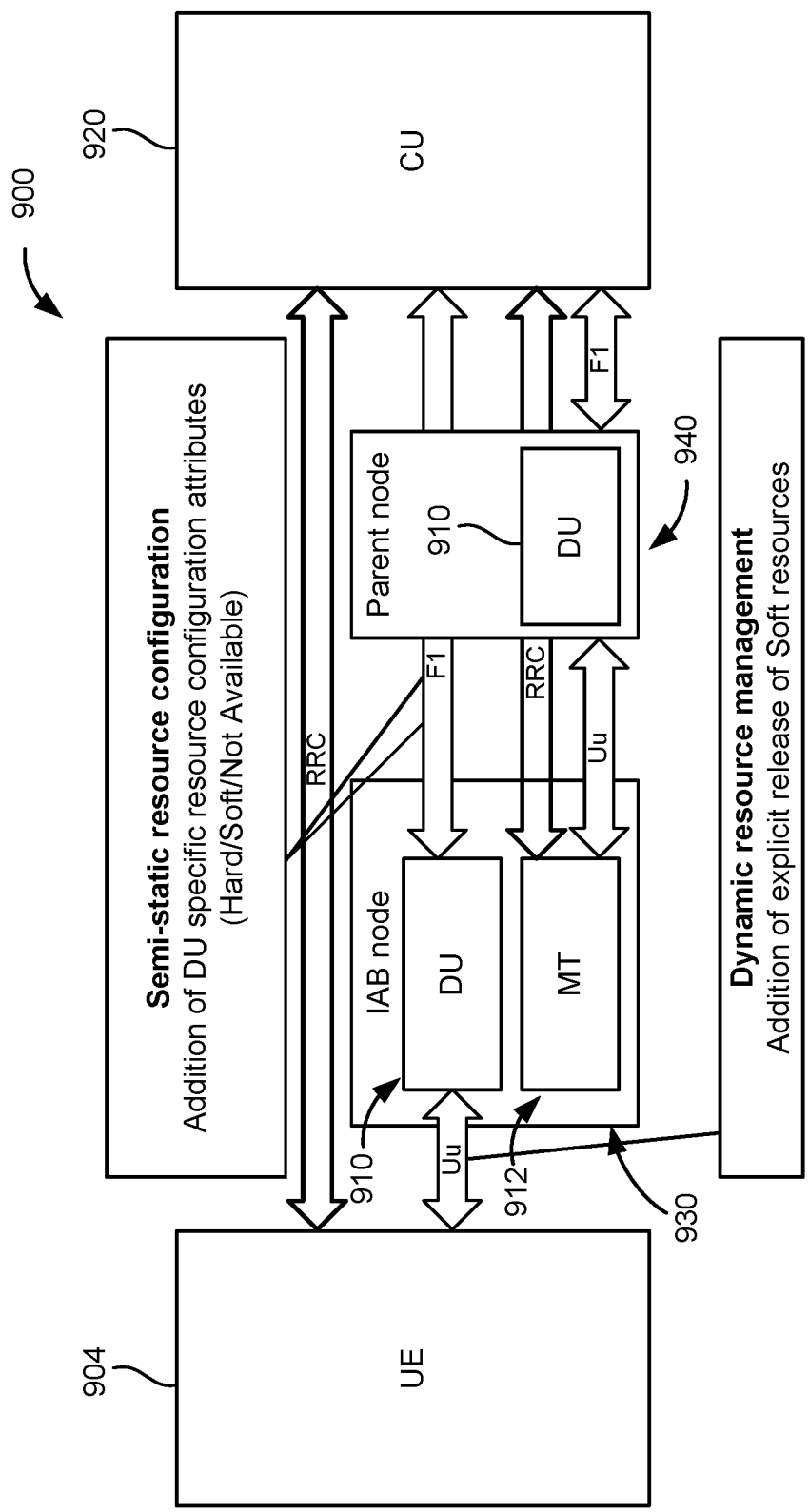
FIG. 9 is a diagram of an example IAB resource management framework, according to aspects of the disclosure.

FIG. 9 is a diagram of an example IAB resource management framework 900 in 3GPP Release 16 (the current set of 5G NR standards), according to aspects of the disclosure. FIG. 9 illustrates a CU 920, a parent node 940, an IAB node 930, and a UE 904 (e.g., any of the UEs described herein). The CU 920 may correspond to one or both of the CU-CP 722 and CU-UP 724 in FIG. 7. The parent node 940 may correspond to any of the IAB nodes 730 in FIG. 7 having a child IAB node 730. The IAB node 930 may correspond to any of the IAB nodes 730 in FIG. 7 having a parent IAB node 730. The IAB node 930 includes a DU 910 and an MT function 912 that may correspond to DU 734 and MT function 732, respectively, in FIG. 7. The parent node 940 also includes a DU 910 and an MT function, but only the DU 910 is shown.

As shown in FIG. 9, the UE 904 and the CU 920 communicate at the RRC layer, whereas the UE 904 and the DU 910 of the IAB node 930 communicate over the Uu interface. Because the IAB node 930 acts as a UE to its parent node 940, the MT function 912 of the IAB node 930 also communicates with the CU 920 at the RRC layer and with the DU 910 of the parent node 940 over the Uu interface (because the link between the IAB node 930 and its parent node 940 is a wireless backhaul link). However, the DUs 910 of the IAB node 930 and parent node 940 communicate with the CU 920 over the F1 interface, as described above with reference to FIG. 8.

In the IAB resource management framework 900, resource and slot format definitions remain compatible with Release 15 UEs. The focus is on the half-duplex constraint and time division multiplexing (TDM) operation between the DU 910 and the MT function 912. Another difference is that additional resource attributes are defined for, and visible to, the DU 910 for semi-static resource configuration. Specifically, the additional attributes include (1) "Hard," the resource can be assumed to be used by the DU 910, (2) "Not Available," the resource cannot be used by the DU 910, and (3) "Soft," by default the resource cannot be used by the DU 910. It can be assumed to be used only if (a) the parent node 940 explicitly releases it, or (b) if the IAB node 930 can determine it does not impact the operation of its MT function 912. Thus, as shown in FIG. 9, the dynamic resource management between the IAB node 930 and the UE 904 includes the additional functionality/signaling of explicit releases for Soft resources.

In an IAB system, a child IAB node needs over the air (OTA) synchronization with its parent IAB node (e.g., parent node 940). Specifically, the child IAB node (e.g., IAB node 930) should set its downlink transmission timing (for the DU downlink transmission function towards its child nodes) ahead of (i.e., earlier than) its downlink reception timing (for the MT downlink reception function towards the parent node) as a function of the child IAB node's TA and T_delta, where T_delta is signaled from the parent IAB node. For example, T_delta may be provided by the parent IAB node in a MAC control element (MAC-CE), just like the TA. The TA ensures that the MT uplink towards the parent node arrives within the CP for all signals the child IAB node transmits to the parent IAB node. T_delta ensures that the RTD offset does not build up as the hop-count between the child IAB node and the IAB donor increases. For example, the function of TA and T_delta may be TA/2+T_delta.

Thus, RTDs change dynamically as a function of the TA and T_delta of an IAB node. This impacts positioning-related timing measurements/reports for UEs (or the MT functions of IAB nodes, if they also use NR positioning). For stationary IAB nodes, the TA may not change much, but some variation is still possible based on beam blocking. For mobile IAB nodes, the TA may vary much more. As such, an important issue is how to keep track of RTDs for IAB nodes.

A first technique described herein is based on a similar issue for uplink SRS timing adjustments. In the SRS case, SRS timing is adjusted by the serving cell, and this adjustment may impact uplink measurements at the non-serving cell(s) for uplink (e.g., UL-TDOA) or downlink-and-uplink (e.g., RTT) positioning methods. There is a similar issue for UE-autonomous TA corrections as well, which may affect even the serving cell. One technique to address this issue includes reporting these adjustments to the location server and/or non-serving cell(s) (where communication to the non-serving cell(s) is via the Xn interface between the base stations and/or via the location server), or freezing the TA so that adjustments are not made during a positioning occasion (e.g., a PRS occasion) or during a positioning session. A report of the adjustment may be triggered when the accumulated change exceeds a threshold, or whenever a TA command is received.

The concepts behind this technique can be extended to an IAB node (e.g., IAB node 930). More specifically, a similar reporting technique can be applied to the TA and/or T_delta parameters for an IAB node. Further, unlike the case of SRS, where the technique is only needed for positioning methods that use SRS (such as uplink-only or downlink-and-uplink methods), in this case, the disclosed technique may be applicable to all positioning methods (as it impacts both downlink and uplink timing) or to all timing-based positioning methods (thus, for example, DL-TDOA would also be included).

The IAB node receiving the TA and/or T_delta parameters may send the report, or the parent IAB node sending the TA and/or T_delta parameters may send the report. Note that the child (i.e., receiving) node can also include the impact of TA changes made autonomously by its MT function. The DU of the IAB node (child or parent) may send the report to the location server via NR positioning protocol A (NRPPa), or the MT function of the IAB node may send the report via LPP, or both. Which type of protocol (NRPPa or LPP) is used may depend on which communication session is active. If both sessions are active, a rule could be defined to select one of them.

Note that the NRPPa protocol is between the gNB and the LMF (e.g., LMF 270) and may be terminated at the CU from the viewpoint of the LMF. However, the CU may effectively extend NRPPa to address each DU separately. The extension may be via the F1-AP protocol, in either a containerized format (where the NRPPa messages are simply passed on over F1-AP as-is with some routing header information added) or in newly defined F1-AP messages that carry the same information carried in the NRPPa messages.

The CU may also send the report to any UEs served by the DU of the IAB node over RRC, and to other UEs via the LMF (e.g., LMF 270) or AMF (e.g., AMF 264) or other network node using, for example, PRS. Alternatively, the CU of the IAB node may send the report to other CUs via the Xn interface. Note that the Xn interface is only between CUs; the CU-to-DU segment uses RRC to/from the MT or F1-AP to/from the DU.

In an aspect, an IAB node may report its new downlink timing that it sets based on the new values for TA and T_delta. Existing signaling between a base station and a location server (e.g., NRPPa from gNB to LMF) already provides a method to report downlink timing changes via an SFN initialization time parameter. However, here, the report would be generated in response to receipt/update of TA and/or T_delta. Note that SFN initialization time itself may be a large report, so the IAB node may report only the change in SFN initialization time.

In an aspect, the reporting options described above may be selected based on the particular positioning method, or on the type of positioning method (downlink-only, downlink-and-uplink, uplink-only, timing, angle, timing plus angle, etc.). The UE(s) receiving the report may use it for UE-based positioning, or to update their "expected RSTD" parameters.

A second technique described herein prevents duplicated reporting. In the first technique, the technique is applied independently by each IAB node. However, a change in TA or T_delta for one IAB node can have a cascading downstream impact that results in a timing change at all the children of that node (both child IAB nodes and UEs). This may result in many reports (from each impacted child) that may be correlated, causing unnecessary overhead signaling.

Accordingly, to save overhead, only "root cause" changes may be reported, and not the resulting downstream changes. In such a report, there should be an association between each change in TA and/or T_delta for a child IAB node to a corresponding change in the downlink timing of the child IAB node. The change(s) can be reported via the function of TA and T_delta. As a first option, the change is intended to cascade downstream, and downstream (child) nodes are prevented from attempting to immediately undo the change. Instead, downstream nodes (UEs and/or child IAB nodes) are informed of the change to cause them to suppress TA and/or T_delta update generation for some number 'N' subsequent slots. 'N' may depend on the hop-count of the downstream node from the node generating the TA and/or T_delta update (where the hop count between two IAB nodes refers to the number of hops over intermediate IAB nodes between them).

A second option allows for CU consolidation of change reports. In this case, each IAB node continues to behave independently, but updates are reported first to the CU (via RRC or F1-AP). The CU examines the reports over a window of slots, identifies "duplicates" caused by downstream cascading, and only passes on the non-duplicated reports to the location server (e.g., LMF 270) and/or UEs involved in positioning. Note that a given UE may not be using PRS (or other positioning signals) from all the IAB nodes in the tree under the CU. Therefore, the UE may be informed of the tree topology so that it can compute the "duplicates" for the IAB nodes of interest to it. A variation on this option is where the CU also controls all the timing adjustments of all the descendent IAB nodes under it. In this case it doesn't need to analyze to remove "duplicates" from among the adjustments it receives, instead, it only issues the needed adjustments (which are thus by default deemed not to be "duplicates"). The CU may control the timing of the descendant nodes based on timing change requests that it receives from these nodes.

A third technique described herein is directed to freezing the TA. In the non-IAB SRS case described above, the TA is generated only by the serving cell, so it is relatively straightforward to freeze TA updates while the UE is involved in a positioning session or during a positioning occasion of a positioning session. In the IAB case, however, the UE may be tracking/measuring PRS (or other positioning signals) from multiple IAB nodes. As such, the TA of all IAB nodes rooted under a CU may need to be frozen if any one of them is being tracked by a UE in a positioning session. The location server (e.g., LMF 270) could notify the CU about whether/which nodes are involved.

In an aspect, a freeze may be avoided for mobile IAB nodes and possibly their immediate children and/or parents. This is because maintaining TA updates may be more important for mobile IAB nodes. Further, and more generally, the selection among the first two techniques described herein may depend on whether or not the IAB node(s) is/are mobile.

A fourth technique described herein is directed to relying on RTD uncertainties. In an aspect, any variation in RTD caused by TA and/or T_delta updates may be captured in RTD uncertainty. There is no need to separately track this variation. This may suffice for non-mobile IAB nodes and/or low-accuracy positioning. However, it may not be preferable for mobile IAB nodes and/or higher-accuracy positioning needs.

From time to time, the IAB topology can change. For example, parent-child relationships among IAB nodes may be reconfigured. The change may be performed semi-statically or dynamically (e.g., by RRC, MAC-CE, or DCI). This also may change the TA and/or T_delta. In such a situation, the same techniques as described above can be used. In particular, "freezing the TA" in this context may mean "disallowing change to the topology" (which may be restrictive for data communications) or "only allowing changes to the topology that can preserve the previous TA and/or T_delta values."

An alternative technique is to have separate PRS timing. In this approach, PRS timing is slaved to an external reference, such as GPS. In that case, PRS are still synchronized network-wide, or have similar RTD-handling as in non-IAB cases. The timing would be independent of TA and/or T_delta and the IAB topology. The drawback, however, is that PRS timing may then conflict with the timing needed for data transmission in the IAB network. To address this, additional guard times may be needed with possibly varying time locations and durations to allow PRS transmissions. Alternatively, PRS could be dropped when the conflicts occur, but this would result in positioning performance suffering. As yet another alternative, the conflicting data could be dropped, but this may impact data throughput and latency.

Figure 10:
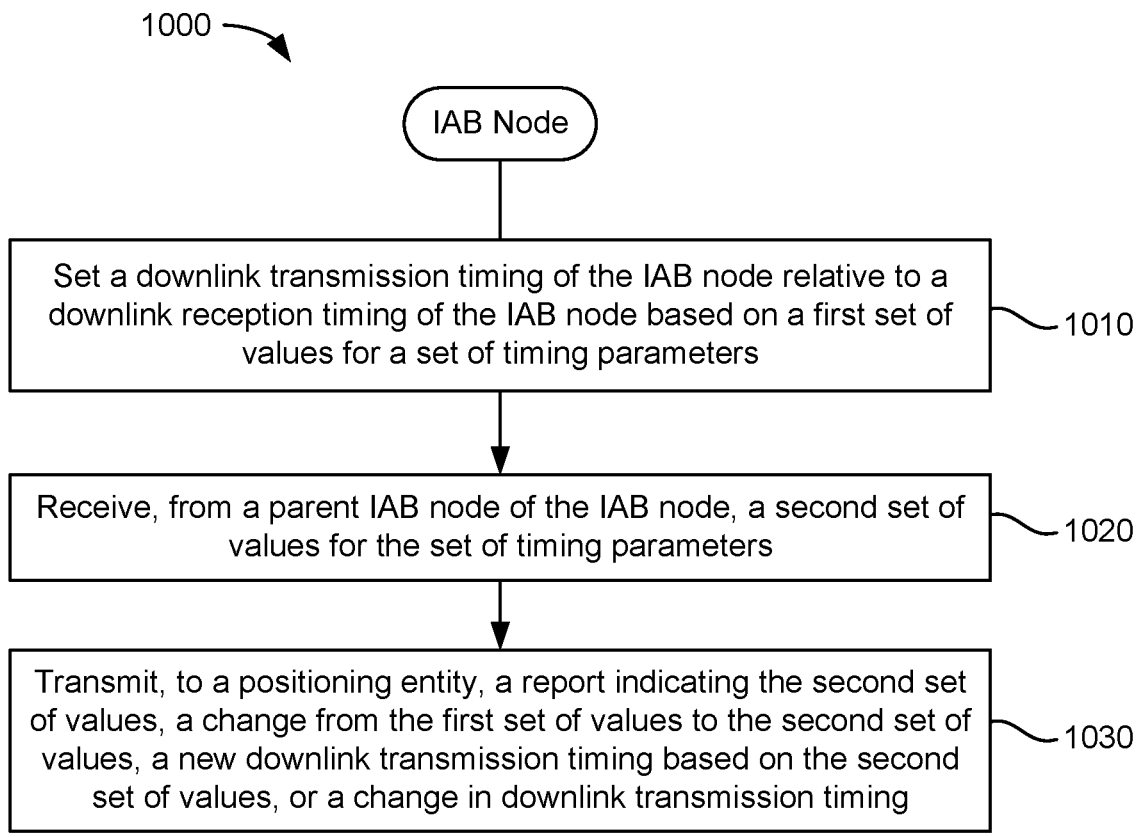
FIGS. 10 and 11 illustrate methods of wireless communication, according to aspects of the disclosure.

FIG. 10 illustrates an example method 1000 of wireless communication, according to aspects of the disclosure. The method 1000 may be performed by an IAB node (e.g., any of the IAB nodes described herein).

At 1010, the IAB node sets a downlink transmission timing of the IAB node relative to a downlink reception timing of the IAB node based on a first set of values for a set of timing parameters (e.g., TA, T_delta). In an aspect, operation 1010 may be performed by WWAN transceiver 350, processing system 384, memory component 386, and/or timing component 388, any or all of which may be considered means for performing this operation.

At 1020, the IAB node receives, from a parent node of the IAB node (e.g., parent node 940), a second set of values for the set of timing parameters. In an aspect, operation 1020 may be performed by WWAN transceiver 350, processing system 384, memory component 386, and/or timing component 388, any or all of which may be considered means for performing this operation.

At 1030, the IAB node transmits, to a positioning entity (e.g., location server 230, LMF 270, UE 204), a report indicating a change from the first set of values to the second set of values, a new downlink transmission timing (of the IAB node) based on the second set of values, or a change in downlink transmission timing (of the IAB node). In an aspect, operation 1030 may be performed by WWAN transceiver 350, processing system 384, memory component 386, and/or timing component 388, any or all of which may be considered means for performing this operation.

Figure 11:
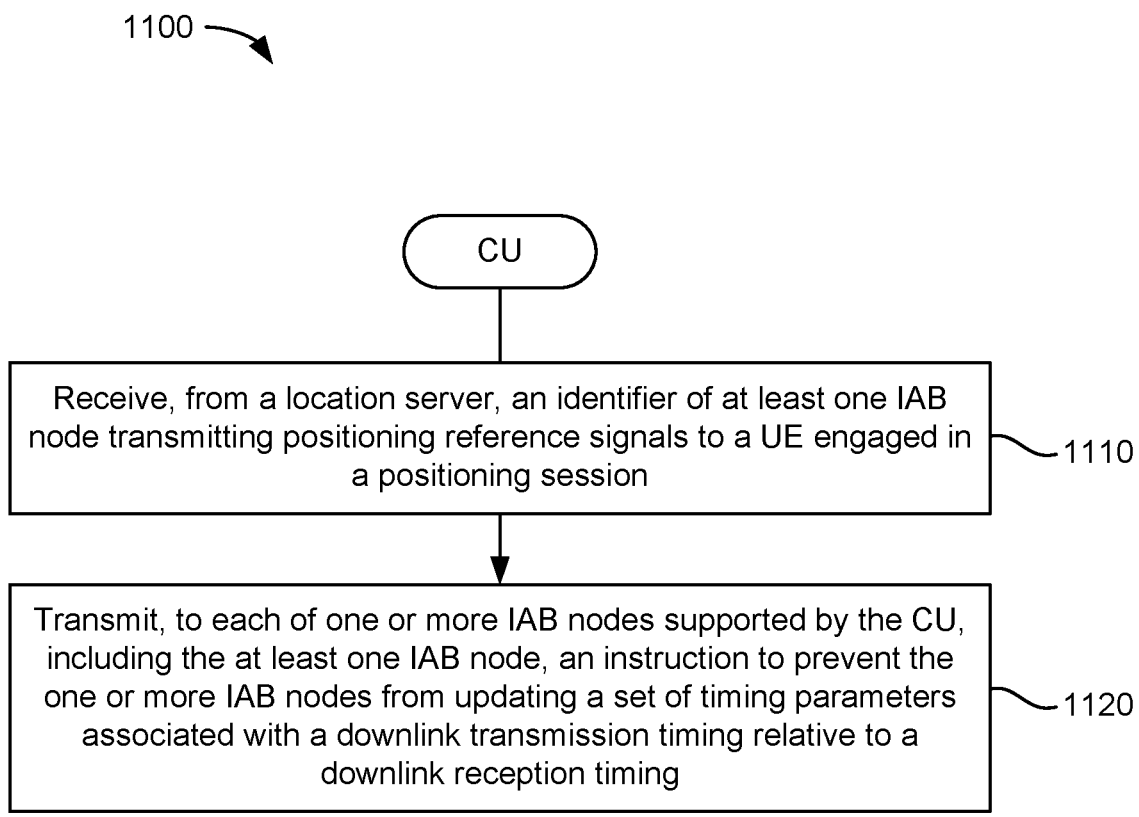

FIG. 11 illustrates an example method 1100 of wireless communication, according to aspects of the disclosure. The method 1100 may be performed by a CU (e.g., any of the CUs described herein).

At 1110, the CU receives, from a location server (e.g., LMF 270), an identifier of at least one IAB node (e.g., any of the IAB nodes described herein) transmitting positioning reference signals (e.g., PRS as defined in LTE and NR) to a UE (e.g., any of the UEs described herein) engaged in a positioning session (e.g., a DL-TDOA, UL-TDOA, RTT, etc. positioning session). In an aspect, operation 1110 may be performed by WWAN transceiver 350, processing system 384, memory component 386, and/or timing component 388, any or all of which may be considered means for performing this operation.

At 1120, the CU transmits, to each of one or more IAB nodes (e.g., any of the IAB nodes described herein) supported by the CU, including the at least one IAB node, an instruction to prevent the one or more IAB nodes from updating a set of timing parameters (e.g., TA, T_delta) associated with a downlink transmission timing relative to a downlink reception timing. In an aspect, operation 1120 may be performed by WWAN transceiver 350, processing system 384, memory component 386, and/or timing component 388, any or all of which may be considered means for performing this operation.

As will be appreciated, and as described herein, a technical advantage of the methods 1000 and 1100 is an improvement to positioning accuracy by enabling better synchronization among IAB nodes. In addition, a technical advantage of the method 1100 is reduced signaling overhead due to timing changes among IAB nodes. Further still, the reduction in signaling may allow the signaling to be carried in L1/L2 signaling (such as DCI, uplink control information (UCI), sidelink control information (SCI) for L1 or MAC-CE for L2), which could also lead to lower latency.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A central unit (CU) in an integrated access and backhaul (IAB) network, comprising:
a memory;
at least one transceiver; and
at least one processor communicatively coupled to the memory and the at least one transceiver, the at least one processor configured to:
receive, from a location server, an identifier of at least one IAB node transmitting positioning reference signals to a user equipment (UE) engaged in a positioning session; and
cause the at least one transceiver to transmit, to each of one or more IAB nodes supported by the CU, including the at least one IAB node based on the received identifier, an instruction to prevent the one or more IAB nodes from updating a set of timing parameters associated with a downlink transmission timing relative to a downlink reception timing for the positioning session.

2. The CU of claim 1, wherein the one or more IAB nodes are stationary IAB nodes.

3. The CU of claim 1, wherein the one or more IAB nodes comprise all IAB nodes supported by the CU.

4. The CU of claim 1, wherein the set of timing parameters comprises a timing advance parameter, a T_delta parameter, or both.

5. The CU of claim 1, wherein the at least one processor causes the at least one transceiver to transmit the instruction over a wireless backhaul link.

6. The CU of claim 1, wherein the at least one transceiver receives the identifier over a wired backhaul link.

7. A method of wireless communication performed by a central unit (CU) in an integrated access and backhaul (IAB) network, comprising:
receiving, from a location server, an identifier of at least one IAB node transmitting positioning reference signals to a user equipment (UE) engaged in a positioning session; and transmitting, to each of one or more IAB nodes supported by the CU, including the at least one IAB node based on the received identifier, an instruction to prevent the one or more IAB nodes from updating a set of timing parameters associated with a downlink transmission timing relative to a downlink reception timing for the positioning session.

8. The method of claim 7, wherein the one or more IAB nodes are stationary IAB nodes.

9. The method of claim 7, wherein the one or more IAB nodes comprise all IAB nodes supported by the CU.

10. The method of claim 7, wherein the set of timing parameters comprises a timing advance parameter, a T_delta parameter, or both.

11. The method of claim 7, wherein the instruction is transmitted by the CU over a wireless backhaul link.

12. The method of claim 7, wherein the identifier is received by the CU over a wired backhaul link.

13. A central unit (CU) in an integrated access and backhaul (IAB) network, comprising:
    means for receiving, from a location server, an identifier of at least one IAB node transmitting positioning reference signals to a user equipment (UE) engaged in a positioning session; and
    means for transmitting, to each of one or more IAB nodes supported by the CU, including the at least one IAB node based on the received identifier, an instruction to prevent the one or more IAB nodes from updating a set of timing parameters associated with a downlink transmission timing relative to a downlink reception timing for the positioning session.

14. The CU of claim 13, wherein the one or more IAB nodes are stationary IAB nodes.

15. The CU of claim 13, wherein the one or more IAB nodes comprise all IAB nodes supported by the CU.

16. The CU of claim 13, wherein the set of timing parameters comprises a timing advance parameter, a T_delta parameter, or both.

17. The CU of claim 13, wherein the instruction is transmitted over a wireless backhaul link.

18. The CU of claim 13, further comprises means for receiving the identifier over a wired backhaul link.

19. A non-transitory computer-readable medium storing computer-executable instructions that, when executed by a central unit (CU) in an integrated access and backhaul (IAB) network, cause the CU to:
    receive, from a location server, an identifier of at least one IAB node transmitting positioning reference signals to a user equipment (UE) engaged in a positioning session; and
    transmit, to each of one or more IAB nodes supported by the CU, including the at least one IAB node based on the received identifier, an instruction to prevent the one or more IAB nodes from updating a set of timing parameters associated with a downlink transmission timing relative to a downlink reception timing for the positioning session.

20. The non-transitory computer-readable medium of claim 19, wherein the one or more IAB nodes are stationary IAB nodes.

21. The non-transitory computer-readable medium of claim 19, wherein the one or more IAB nodes comprise all IAB nodes supported by the CU.

22. The non-transitory computer-readable medium of claim 19, wherein the set of timing parameters comprises a timing advance parameter, a T_delta parameter, or both.

23. The non-transitory computer-readable medium of claim 19, wherein the instruction is transmitted by the CU over a wireless backhaul link.

24. The non-transitory computer-readable medium of claim 19, wherein the identifier is received by the CU over a wired backhaul link.

* * * * *